United States Patent
Ito (10) Patent No.: US 7,859,484 B2
(45) Date of Patent: Dec. 28, 2010

(54) THREE-DIMENSIONAL DISPLAY APPARATUS

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 821 days.

(21) Appl. No.: 11/689,064

(22) Filed: Mar. 21, 2007

(65) Prior Publication Data

US 2007/0229495 A1    Oct. 4, 2007

(30) Foreign Application Priority Data

Mar. 28, 2006  (JP) .............................. 2006-089397

(51) Int. Cl.
G09G 5/00    (2006.01)
(52) U.S. Cl. .......................................... 345/6; 345/419
(58) Field of Classification Search ..................... 345/6, 345/32, 46, 419; 359/462, 463; 348/51–54
See application file for complete search history.

(56) References Cited

U.S. PATENT DOCUMENTS

| | | | |
|---|---|---|---|
| 7,148,859 B2 * | 12/2006 | Suyama et al. .................. | 345/6 |
| 7,319,436 B2 * | 1/2008 | Tomisawa ....................... | 345/6 |
| 2004/0104871 A1 * | 6/2004 | Boldt et al. .................... | 345/82 |

FOREIGN PATENT DOCUMENTS

JP    2000261833 A  *  9/2000
JP    2001-175883       6/2001

OTHER PUBLICATIONS

English Translation of JP-2000261833A.*

* cited by examiner

Primary Examiner—Amare Mengistu
Assistant Examiner—Hong Zhou
(74) Attorney, Agent, or Firm—Panitch Schwarze Belisario & Nadel LLP (57) ABSTRACT

A three-dimensional display apparatus is provided that is suitable for displaying information or instruction relating to the work that the viewer is doing. The three-dimensional display apparatus has a display data generation unit for generating a plurality of display data each expressing a screen at a depth from a viewpoint of a viewer in a three-dimensional space and a lens driving unit for varying the focal length of the variable focal length lenses according to the depth of the display data generated by the display data generation unit. The display data generation unit generates the display data each expressing a different depth and causing a plurality of virtual images of the light emitting points appropriate to the depth to be perceived as being overlapped. The lens driving unit controls the focal length of the variable focal length lenses according to the depth of the display data generated by the display data generation unit in synchronization with displaying the display data on the display unit by the display driving unit.

13 Claims, 5 Drawing Sheets

THREE-DIMENSIONAL DISPLAY APPARATUS

BACKGROUND OF THE INVENTION

This invention relates to a three-dimensional display apparatus used as an output apparatus of an image processing apparatus such as, e.g., a so-called CAD (Computer Aided Design) and a computer.

Holography has been known as a technology to display three-dimensional images.

The holography is a method to reproduce a three-dimensional image by recording on a prescribed medium the interference fringes formed by the interference of the reference beam, i.e., a light from a laser or the like, and the object beam, i.e., the light reflected by an object that another light from the laser or the like irradiates, and by regenerating the image of the object by causing the same light as the reference beam to irradiate the recorded interference fringes. However, the holography cannot reproduce an arbitrary three-dimensional image according to inputs, and thus, has not yet been practically applied to an output means of an information apparatus and the like.

As another three-dimensional display apparatus to which a technology other than the holography is applied, there exists a virtual reality apparatus, as described in Japanese Patent Application Publication 2001-175883. The virtual reality apparatus has two-dimensional displays made of liquid crystal and the like for each of the right and left eyes of a viewer and shows images on the displays upon correcting images for the right and left eyes respectively according to the position of the image in the three-dimensional space so as to enable the viewer to perceive a pseudo three-dimensional image. The virtual reality apparatus can display an arbitrary three-dimensional image according to inputs by changing a correction value for correcting images for the right and left eyes respectively.

However, such a conventional virtual reality apparatus including the virtual reality apparatus described in Japanese Patent Application Publication 2001-175883 has a problem that it is very difficult for the viewer to do other works while wearing the display apparatus since the display apparatus should be fixed to the face of the viewer, and thus, the display apparatus is not suitable for displaying information or instruction relating to the work that the viewer is doing.

This invention has been made to solve such problem, and aims to provide a three-dimensional display apparatus suitable for displaying information or instruction relating to the work that the viewer is doing.

BRIEF SUMMARY OF THE INVENTION

In order to solve such problem, the present invention provides a three-dimensional display apparatus for displaying a three-dimensional image, the three-dimensional display apparatus comprising a display unit including a plurality of pixels each having a plurality of light emitting points, a variable focal length lens panel including a plurality of variable focal length lenses arranged to correspond to each of the pixels forming the display unit, a display data generation unit for generating based on data of an image to be displayed on the display unit a plurality of display data each expressing a screen at a depth from a viewpoint of a viewer in a three-dimensional space, a lens driving unit for varying the focal length of the variable focal length lenses according to the depth of the display data generated by the display data generation unit, and a display driving unit for driving the light emitting points forming the display unit according to the display data generated by the display data generation unit, wherein the display data generation unit generates the display data each expressing a different depth and causing a plurality of virtual images of the light emitting points appropriate to the depth to be perceived as being overlapped, and wherein the lens driving unit controls the focal length of the variable focal length lenses according to the depth of the display data generated by the display data generation unit in synchronization with displaying the display data on the display unit by the display driving unit.

The three-dimensional display apparatus displays three-dimensional images by generating the display data each expressing a different depth and causing a plurality of virtual images of the light emitting points appropriate to the depth to be perceived as being overlapped and by controlling the focal length of the variable focal length lenses according to the depth of the display data generated by the display data generation unit in synchronization with displaying the display data on the display unit by the display driving unit.

Therefore, the three-dimensional display apparatus according to the present invention can display three-dimensional images at the display unit, and thus, does not limit the vision of the viewer unlike conventional apparatuses that need to be attached to the face of the viewer.

That is, the three-dimensional display apparatus makes it easier for the viewer to do other works simultaneously with viewing the three-dimensional image, thus being very effective as a display apparatus for displaying information or instruction relating to the work that the viewer is doing.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Particular embodiments according to this invention is hereinafter described in details with reference to the figures.

A three-dimensional display apparatus according to the first embodiment of this invention displays three-dimensional images. Particularly, the three-dimensional display apparatus is suitable as an output unit of an image processing apparatus, and displays three-dimensional images by so displaying a plurality of virtual images of light emitting points that a viewer perceives the virtual images thereof as being overlapped.

The three-dimensional display apparatus according to the first embodiment will be hereinafter described.

Figure 1:
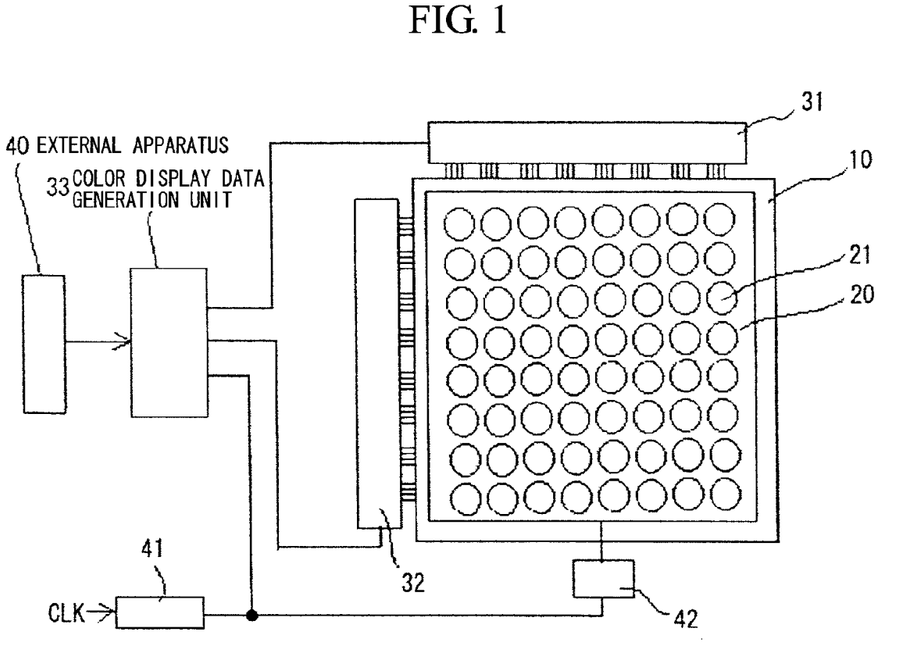
FIG. 1 is a diagram showing a structure of the three-dimensional display apparatus according to the first embodiment of this invention.

The three-dimensional display apparatus has a two-dimensional display unit 10 formed with a plurality of pixels arranged in a two-dimensional plane, and has a variable focal length lens panel 20 arranged parallel to the two-dimensional display unit 10 with a prescribed clearance.

Figure 2:
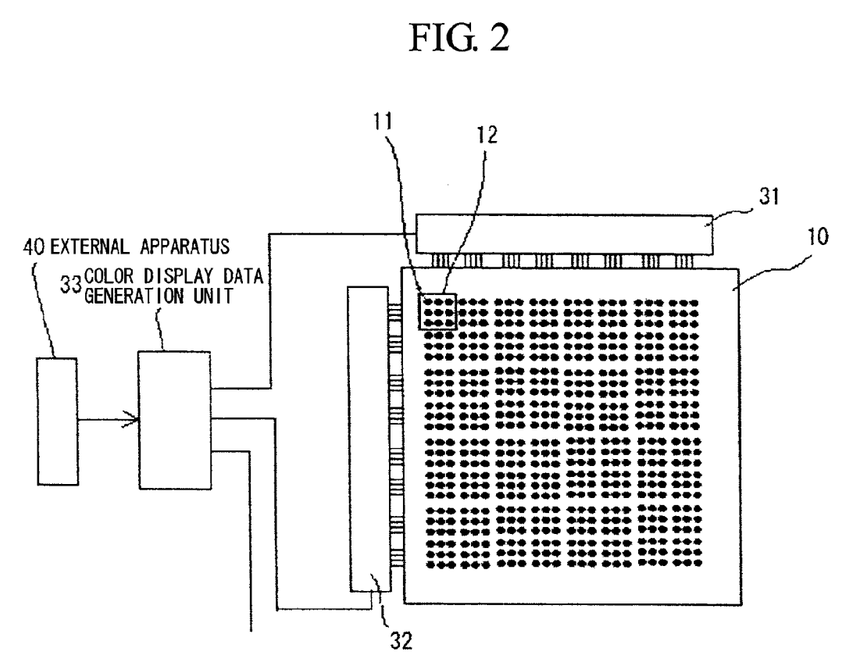
FIG. 2 is a front view showing a structure of a two-dimensional display unit of the three-dimensional display apparatus according to the first embodiment of this invention.

The two-dimensional display unit 10 has pixels 12 each consisting of light emitting points 11, for example, arranged in a three by three grid as shown in FIG. 1. The multiple numbers of the pixels 12 are arranged with a constant interval. It is desirable that 400 pieces or more of pixels 12 be arranged in each of the vertical and horizontal directions. The two-dimensional display unit 10 has only to display two-dimensional images using the three primary colors. An arbitrary display apparatus can be used as the two-dimensional display unit 10 such as, e.g., liquid crystal display apparatus, CRT (Cathode Ray Tube) display, plasma display, and SED (Surface-conduction Electron-emitter Display). For the sake of convenience, a case where light emitting diodes are used as the light emitting points 11 will be hereinafter described. Each of the light emitting points 11 forming the two-dimensional display unit 10 as described above is driven by two drivers, namely, a segment driver 31 and a common driver 32. A color display data generation unit 33 generates display data and provides the segment driver 31 and the common driver 32 with the display data. The segment driver 31 and the common driver 32 drive each of the light emitting points 11 based the display data. The color display data generation unit 33 generates the display data for driving the light emitting points 11 based on image data provided by an external apparatus 40 such as, e.g., a personal computer and a workstation that generates the image data to be displayed on the two-dimensional display unit 10. The color display data generation unit 33 so generates the display data that a plurality of virtual images of the light emitting points 11 are perceived as being overlapped as described later. The structure of the color display data generation unit 33 will be described later.

Figure 3A:
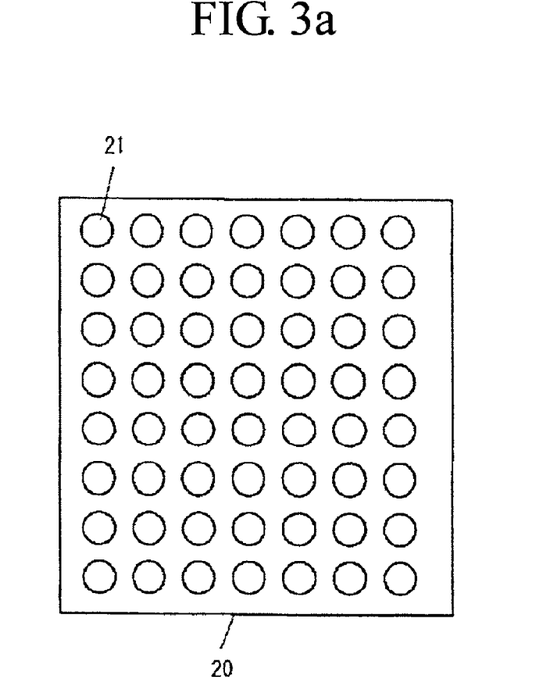
FIG. 3a is a front view showing a structure of a variable focal length lens panel of the three-dimensional display apparatus according to the first embodiment of this invention.

On the other hand, the variable focal length lens panel 20 is formed with a plurality of variable focal length lenses 21 arranged in a two-dimensional plane as shown in FIG. 3 (a). Each of the variable focal length lenses 21 are arranged to correspond to each of the pixels 12. The focal length of the variable focal length lenses 21 are controlled by a lens focal length driver 42 connected to the variable focal length lens panel 20 based on a signal provided by a screen switching unit 41. A variable focal length lens using a liquid crystal is disclosed in "No. 1, liquid crystal molecular orientation effect by nonuniform electromagnetic field and the application thereof" in "Studies in Applied Electromagnetics and Mechanics Vol. 3" by the Japan Society of Applied Electromagnetics and Mechanics.

Figure 3B:
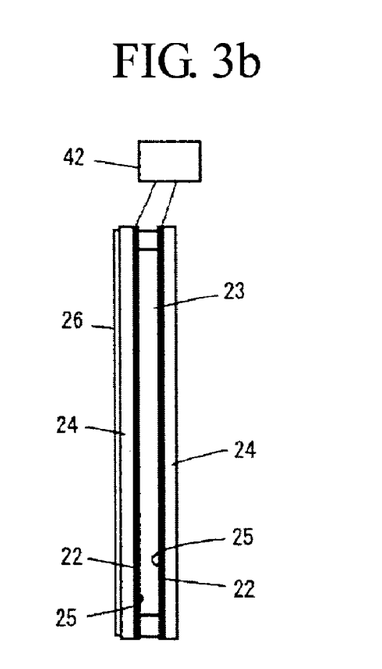
FIG. 3b is a cross section showing a structure of the variable focal length lens panel of the three-dimensional display apparatus according to the first embodiment of this invention.

The variable focal length lens panel 20 has a structure in which two electrodes 22 sandwich a liquid crystal 23 made of nematic liquid crystal as shown in FIG. 3b. The two electrodes 22 are made from thin metal films formed, for example, by vapor deposition, on a surface of a transparent plates 24 such as, e.g., glass. The two electrodes 22 have circular perforations formed on the areas that are to become lenses arranged in a two-dimensional plane. The variable focal length lens panel 20 has the two electrodes 22 sandwiching the liquid crystal 23 with the circular perforations arranged on the areas that are to become lenses and with the thin metal films facing the liquid crystal 23. Liquid-crystal alignment films 25 whose molecules are made to align parallel to those of the electrodes 22 are arranged on both inner sides of the electrodes 22, namely, on both outer sides of the liquid crystal 23. The liquid crystal 23 is arranged between the liquid-crystal alignment films 25. On one of the transparent plates 24 facing the display unit, a polarizer 26 is arranged for allowing to pass only a linearly polarized light polarized in the same direction as the molecules of the liquid crystal 23.

In a case where a driving voltage is provided between the electrodes 22 of one of the variable focal length lenses 21 of the variable focal length lens panel 20, although the electric field in the center of the perforation stays too weak to change the liquid crystal alignment, the electric field becomes increasingly stronger toward the periphery of the perforation. Thus, near the periphery, the liquid crystal alignment is rendered in the direction of the electric field between the electrodes 22. Therefore, the variable focal length lens panel 20 can create a situation in which the refractive index of the crystal is small in the center and becomes increasingly larger toward the periphery to form a convex lens. The viewer sees the two-dimensional display unit 10 through the variable focal length lenses 21 so that the viewer perceives the three-dimensional image.

The variable focal length lens panel 20 is not limited to the liquid crystal lens as described above, and other liquid type variable focal length lenses and the like can be employed.

As described above, the three-dimensional display apparatus changes the focal length of each of the variable focal length lenses 21 according to the driving voltage output by the lens focal length driver 42. The light emitted from each of the light emitting points 11 goes into only the corresponding lens of the variable focal length lenses 21, and the electrodes 22 block the light in such a way as to prevent the light from going into the adjacent lenses of the variable focal length lenses 21.

With the three-dimensional display apparatus including the two-dimensional display unit 10 and the variable focal length lens panel 20, the viewer sees the two-dimensional display unit 10 through the variable focal length lenses 21 to perceive virtual images of the multiple light emitting points 11 as being overlapped. The optical system of the three-dimensional display apparatus is structured as shown in FIG. 4 in order to realize such a display method.

Figure 4:
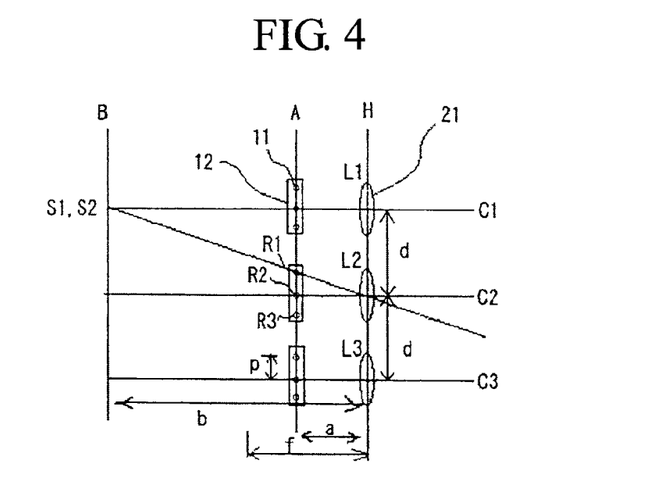
FIG. 4 is a schematic diagram showing a structure of an optical system of the three-dimensional display apparatus according to the first embodiment of this invention.

In FIG. 4, three lenses of the variable focal length lenses 21, namely, a variable focal length lens L1, L2, and L3, respectively have an optical axis C1, C2, and C3. A principal plane H includes principal points of the three lenses of the variable focal length lenses 21, namely, the variable focal length lens L1, L2, and L3. A light emitting plane A includes three light emitting points of the light emitting points 11, namely, a light emitting point R1, R2, and R3, of the two-dimensional display unit 10. In the three-dimensional display apparatus, a virtual image plane B of virtual images of the light emitting points 11 through the variable focal length lenses 21 is determined in accordance with a focal plane including focal points of the three of the variable focal length lenses 21, namely, the variable focal length lens L1, L2, and L3. This relationship is expressed with the following equation (1), where f is the focal length of the variable focal length lenses 21, a is the distance between the light emitting plane A and the principal plane H, and b is the distance between the virtual image plane B and the principal plane H.

$$1/a - 1/b = 1/f \tag{1}$$

In a case of FIG. 4, a is smaller than f.

In the three-dimensional display apparatus, where the distance between each of the optical axis C1, C2, and C3 of the variable focal length lenses 21 is d, the distance between the centers of the adjacent pairs of the pixels 12 is also d. The three light emitting points of the light emitting points 11, namely, the light emitting point R1, R2, and R3, of the pixels 12 are arranged with a constant interval, namely, a prescribed pitch p, as shown in FIG. 4. Among the three light emitting points of the light emitting points 11, namely, the light emitting point R1, R2, and R3, the light emitting point R2 is on the optical axis C1, C2, or C3. Where the three-dimensional display apparatus causes the light emitting point R2 on the optical axis C1 and the light emitting point R1, away from the center of the light emitting point R2 by the distance p, on the optical axis C2 to emit light as shown by filled circles in FIG. 4, a virtual image S1 of the light emitting point R2 formed by the variable focal length lens L1 is generated at the same position as the virtual image S2 of the light emitting point R1 formed by the variable focal length lens L2. At this moment, the following equation (2) applies.

$$d/b = p/a \tag{2}$$

The equation (3) as below is given from the equation (2), where the virtual image distance b is b1 and where b1 is the light emitting point distance a multiplied by m, that is, b1=ma.

$$d = m*p \tag{3}$$

The relationship of the equation (2) can be applied to any pixels in the vertical direction and the horizontal direction. That is, the three-dimensional display apparatus selects one light emitting point of the light emitting points 11 in three by three grid in each of eight pixels (3*3−1=8) of the pixels 12 surrounding one pixel of the pixels 12 as a center so as to allow the viewer to perceive virtual images of nine light emitting point of the light emitting points 11 as being overlapped.

When the viewer sees the light passing through the variable focal length lenses 21, the three-dimensional display apparatus so displays the virtual images of the light emitting points 11 that the viewer perceives the virtual images thereof as being overlapped to perceive the light emitting points 11 as having an extension in depth.

A case is hereinafter described in which the three-dimensional display apparatus arranges the virtual images in a far distance.

Figure 5:
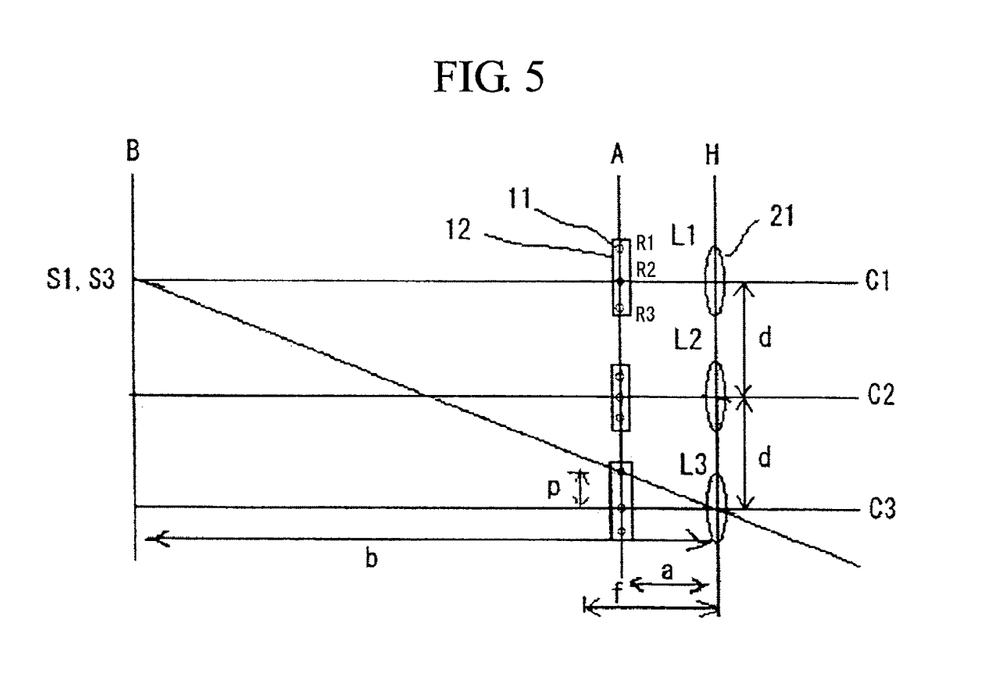
FIG. 5 is a schematic diagram showing a structure of an optical system of the three-dimensional display apparatus according to the first embodiment of this invention where a virtual image is arranged to be positioned in the further distance than the structure shown in FIG. 4.

In order to arrange the virtual images in a far distance so as to have the viewer perceive the virtual images in deep depth as shown in FIG. 5, the following equation (4) should be satisfied. The equation (4) is based on the equation (2). The equation (4) has a variable n which is an integer, and n is two in a case of FIG. 5.

$$(n*d)/(n*b) = p/a \tag{4}$$

As is evident from the equation (4), the three-dimensional display apparatus can display the virtual images at the far away position, namely, at the position of the virtual image distance b being n*b1 by causing the light emitting point R2 on the optical axis C1 and the light emitting point R1 of one of the pixels 12 corresponding to the optical axis C3 to emit light. The optical axis C3 of the variable focal length lens L3 is away from the optical axis C1 by a distance n*d. The light emitting point R1 is away from the center of the light emitting point R2 by the distance p. Thus, the virtual image S1 of the light emitting point R2 is overlapped with the virtual image S3 of the light emitting point R1 of the one of the pixels 12 corresponding to the optical axis C3.

The relationship of the equation (4) can also be applied to other pixels in the vertical direction and the horizontal direction. That is, the three-dimensional display apparatus selects one light emitting point of the light emitting points 11 in three by three grid in each of eight pixels of the pixels 12, around one pixel of the pixels 12 as the center, away from the center of the light emitting point R2 by the distance n*d in the vertical direction and/or the horizontal direction. Thus, the three-dimensional display apparatus allows the viewer to perceive virtual images of nine light emitting points of the light emitting points 11 as being overlapped at the virtual image distance of b multiplied by n. The focal length f of the present case can be calculated from the equation (1). The focal length f is expressed with the following equation (5) in a case of b=n*b1=n*m*a.

$$f = n*m*a/(n*m-1) \tag{5}$$

As hereinabove described, the three-dimensional display apparatus having such optical system capable of overlapping the virtual images of a plurality of the light emitting points 11 enables the viewer to perceive the light emitting points 11 as having extension in depth so as to display three-dimensional images.

Figure 6:
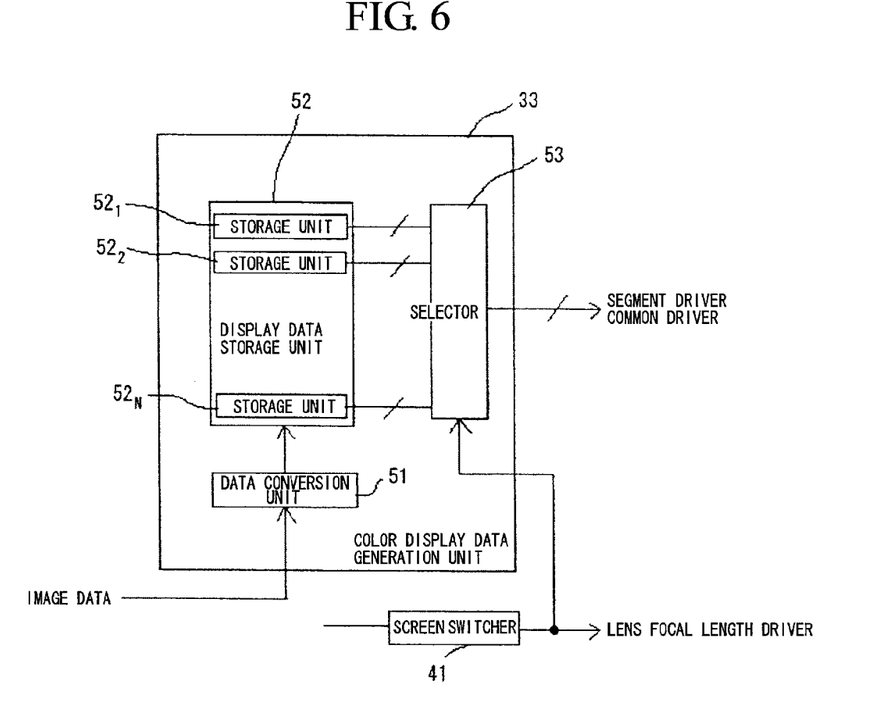
FIG. 6 is a block diagram showing a structure of a color display data generation unit of the three-dimensional display apparatus according to the first embodiment of this invention.

The three-dimensional display apparatus has the color display data generation unit 33 so generate display data that the virtual images of a plurality of the light emitting points 11 are perceived as being overlapped. Specifically, the color display data generation unit 33 has a data conversion unit 51 for converting an image data into a plurality of display data, a display data storage unit 52 for storing the display data converted by the data conversion unit 51, and a selector 53.

The data conversion unit 51 converts the image data provided as encoded data by the external apparatus 40 into the number N of the display data each containing data of a screen of a certain depth from the viewpoint of the viewer in the virtual three-dimensional space. For example, the data conversion unit 51 converts the image data into a near display data including images to be positioned at a near distance in the virtual three-dimensional space that the viewer perceives, an intermediate display data including images to be positioned in an intermediate distance therein, and a distant display data including images to be positioned at a far distance therein. Specifically, the data conversion unit 51 converts the image data into the display data including information about the light emitting points 11 expressing the depth as hereinabove described using FIG. 4 and FIG. 5. A case has been hereinabove described where the number N of display data is three, that is, the display data is made up of the near display data, the intermediate display data, and the distant display data. However, the number N of display data is not limited to three, and the data conversion unit 51 can convert the image data into an arbitrary number of the display data.

The display data storage unit 52 has the number N of storage units 52-1, 52-2, . . . , 52-N each of which stores the display data converted by the data conversion unit 51. The display data stored in the display data storage unit 52 is provided to the segment driver 31 and the common driver 32 via the selector 53.

The selector 53, based on a switching signal provided by a screen switcher 41, reads in sequence one of the number N of the display data stored in the display data storage unit 52 and provides the segment driver 31 and the common driver 32 with the read display data. The screen switcher 41 generates a clock for switching the screen and provides the selector 53 and a lens focal length driver 42 with the generated clock as the switching signal. Thus, the display data is switched at each clock of a cycle of clocks having the number N of the clocks.

The operation of the three-dimensional display apparatus is hereinafter described.

The external apparatus 40 provides the color display data generation unit 33 with the three-dimensional image data corresponding to the number N of screens each of a certain depth. Accordingly, the color display data generation unit 33 converts the image data for the number N of screens into the number N of the display data and stores the converted display data in the display data storage 52 according to the number N of screens each of a certain depth.

Where the number N of the display data are stored in the display data storage unit 52, the selector 53 subsequently reads in sequence, based on the switching signal provided by the screen switcher 41, the number N of the display data stored in the display data storage unit 52 according to the number N of the screens and provides the segment driver 31 and the common driver 32 with the read display data.

On the other hand, the lens foal length driver 42 controls, based on the switching signal provided by the screen switcher 41, a driving voltage of the variable focal length lens panel 20 in accordance with the display data read out from the display data storage unit 52 by the selector 53, namely, the display data to be displayed on the two-dimensional display unit 10.

Specifically, based on the switching signal provided by the screen switcher 41, the lens focal length driver 42 renders shorter focal length of the variable focal length lenses 21 by applying a high voltage to the variable focal length lenses 21 where the viewer should perceive the two-dimensional display unit 10 as a deep screen, whereas the lens focal length driver 42 renders longer the focal length of the variable focal length lenses 21 by applying a low voltage to the variable focal length lenses 21 where the viewer should perceive the two-dimensional display unit 10 as a shallow screen. Thus, the lens focal length driver 42 can control the focal length of each of the variable focal length lenses 21 in accordance with the depth of the display data read out of the display data storage unit 52. The driving voltages output from the lens focal length driver 42 for driving the variable focal length lenses 21 are previously determined each corresponding to the depth of the screen that the viewer perceives and to the location of the focal point.

After the focal length of each of the variable focal length lenses 21 is thus adjusted, the three-dimensional display apparatus drives the two-dimensional display unit 10 with the segment driver 31 and the common driver 32 based on the display data so as to cause the light emitting points 11 corresponding to the display data to emit light. Specifically, the segment driver 31 selects a segment of the two-dimensional display 10 based on the display data at a prescribed timing according to the clock for displaying. Synchronized with the selection of a segment, the common driver 32 causes the light emitting points 11 of the selected segment in the first row to emit light. This operation is repeated for each row of the two-dimensional display 10 of the three-dimensional display apparatus so that a screen of a certain depth is displayed on the two-dimensional display unit 10.

The three-dimensional display apparatus repeats in sequence such operation of displaying each of the screens for the number N of the display data based on the provided switching signal so that the number N of the display data each having a different depth are displayed on the two-dimensional display 10. Thus, with the three-dimensional apparatus, the viewer perceives the image data as a three-dimensional image upon viewing the light passing through the variable focal length lenses 21.

Where the three-dimensional display apparatus employs a displaying method of 1/30 second per frame so as to display three-dimensional motion pictures without flicker (blinking), a scan cycle of a frame is 33 milliseconds or less, and 30 frames or more of a three-dimensional image should be displayed in a second. Thus, if the number of screens in depth is N, the three-dimensional display apparatus should display 30*N screens or more in a second. That is, the three-dimensional display apparatus repeats the operation of providing each display data, controlling the focal length of the variable focal length lenses 21, and driving the two-dimensional display apparatus 10 at the speed of as much as 30*N times a second so that the three-dimensional display apparatus displays the three-dimensional images without flicker.

As hereinabove described, the three-dimensional display apparatus according to the first embodiment of this invention converts three-dimensional image data provided by the external apparatus 40 into the display data in which the virtual images of multiple light emitting points 11 according to the depth are perceived as being overlapped by the viewer. Further, where the three dimensional display apparatus successively displays the converted display data on the two-dimensional display unit 10 with the segment driver 31 and the common driver 32, the three-dimensional display apparatus controls the focal length of the variable focal length lenses 21 according to the depth that the display data is to be perceived as, and thus, the three-dimensional display apparatus can display the three-dimensional image.

With the three-dimensional apparatus as hereinabove described, the viewer sees the two-dimensional display unit 10 through the variable focal length lenses 21 so that the viewer perceives the three-dimensional image. Therefore, the three-dimensional apparatus is advantageous in not limiting the vision of the viewer unlike conventional apparatuses that need to be attached to the face of the viewer. That is, the three-dimensional display apparatus of the present invention enables the viewer to do other works easily while viewing the three-dimensional image, thus being very effective as a display apparatus for displaying information or instruction relating to the work that the viewer is doing. The three-dimensional apparatus can express objects stereoscopically, namely, appearing to have extension in depth, through displaying the three-dimensional image as described above.

The three-dimensional apparatus according to the second embodiment is hereinafter described.

The three-dimensional apparatus according to the second embodiment has more numbers of light emitting points per pixel than that according to the first embodiment. Therefore, the structures of the second embodiment that are the same as those of the first embodiment are given identical reference signs, and the description thereof is deemed to be incorporated herein by reference.

Figure 7:
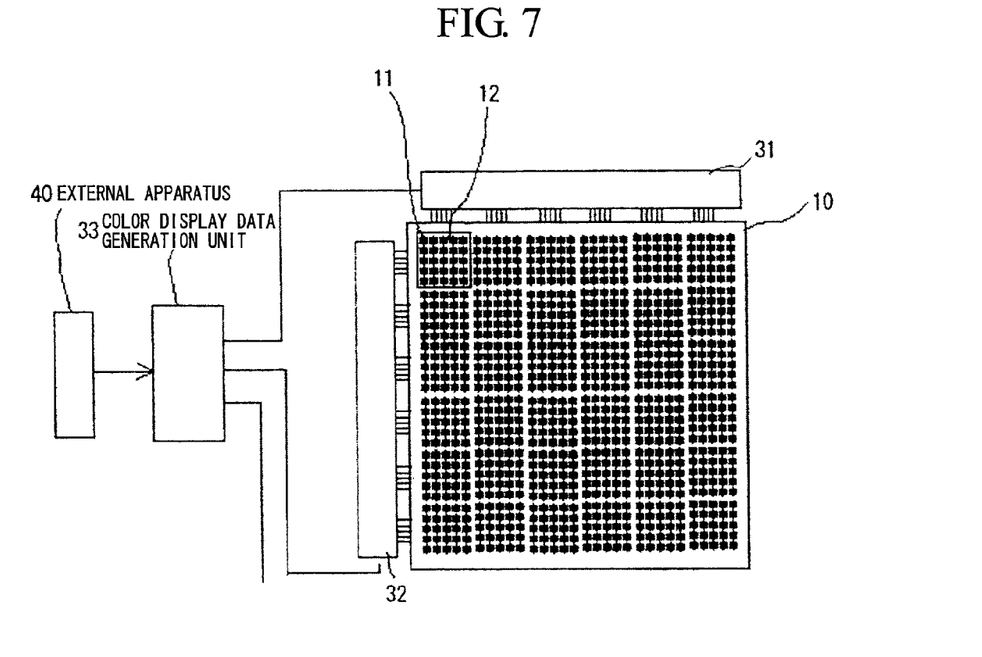
FIG. 7 is a front view showing a structure of a two-dimensional display unit of the three-dimensional display apparatus according to the second embodiment of this invention.

In the three-dimensional apparatus according to the second embodiment, the two-dimensional display unit 10 has the pixels 12 each of which is formed with the light emitting points 11 arranged in 5 by 5 grid as a group. Each of the variable focal length lenses 21 on the variable focal length lens panel 20 is arranged to correspond to respective one of the pixels 12 forming the two-dimensional display unit 10. The focal length of the variable focal length lenses 21 are controlled by the lens focal length driver 42 connected to the variable focal length lens panel 20 based on the signals provided by the screen switching unit 41. The three-dimensional display apparatus varies the focal length of each of the variable focal length lenses 21 according the driving voltage output by the lens focal length driver 42. The light emitted from each of the light emitting points 11 goes into only the corresponding lens of the variable focal length lenses 21, and the electrodes 22 block the light in such a way as to prevent the light from going into the adjacent lenses of variable focal length lenses 21.

The three-dimensional display apparatus including the two-dimensional display unit 10 and the variable focal length lens panel 20 displays the virtual images of the multiple light emitting points 11 as being overlapped. The optical system of the three-dimensional display apparatus is structured as shown in FIG. 8 in order to realize such a displaying method.

Figure 8:
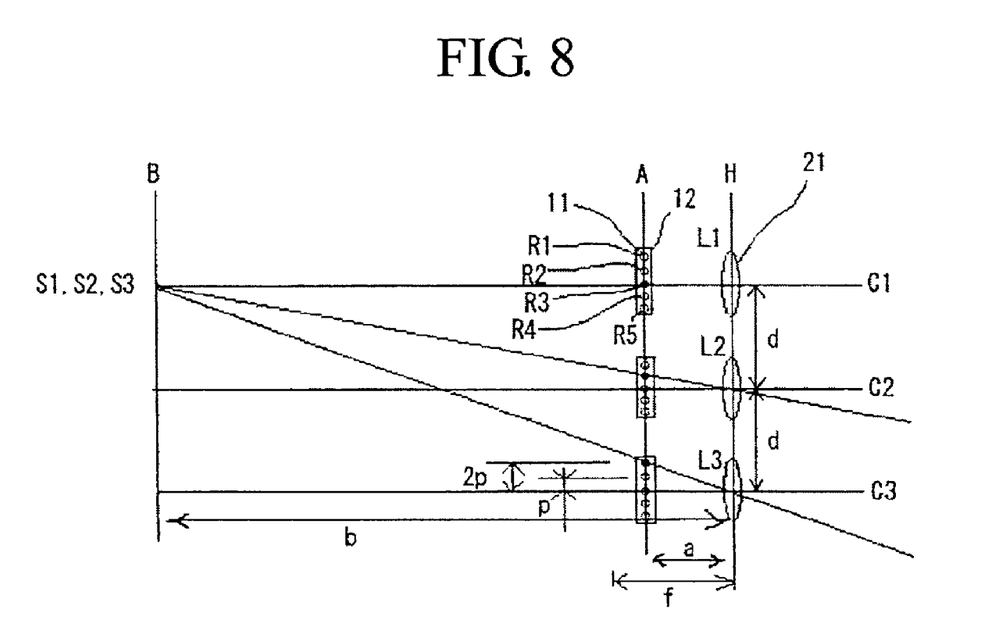
FIG. 8 is a schematic diagram showing a structure of an optical system of the three-dimensional display apparatus according to the second embodiment of this invention.

In FIG. 8, three variable focal length lenses of the variable focal length lenses 21, namely, a variable focal length lens L1, L2, and L3, respectively have an optical axis C1, C2, and C3. A principal plane H includes the principal points of the three variable focal length lenses of the variable focal length lenses 21, namely, the variable focal length lens L1, L2, and L3. A light emitting plane A includes five light emitting points of the light emitting points 11, namely, a light emitting point R1, R2, R3, R4, and R5, of the two-dimensional display unit 10. In the three-dimensional display apparatus, a virtual image plane B of the virtual images of the light emitting points 11 through the variable focal length lenses 21 is determined in accordance with a focal plane including focal points of the three variable focal length lenses of the variable focal length lenses 21, namely, the variable focal length lens L1, L2, and L3, in the same manner as the first embodiment. This relationship is expressed with the equation (1) where f is the focal length of the variable focal length lenses 21, a is the distance between the light emitting plane A and the principal plane H, and b is the distance between the virtual image plane B and the principal plane H.

In the three-dimensional display apparatus, where the distance between each of the optical axis C1, C2, and C3 of the variable focal length lenses 21 is d, the distance between the centers of the adjacent pairs of the pixels 12 is also d. The five light emitting points of the light emitting points 11, namely, the light emitting point R1, R2, R3, R4, and R5, of the pixels 12 are arranged with a constant interval, namely, a prescribed pitch p, as shown in FIG. 8. Among the five light emitting points of the light emitting points 11, namely, the light emitting point R1, R2, R3, R4, and R5, the light emitting point R3 is on the optical axis C1, C2, or C3. In the three-dimensional display apparatus, where the light emitting point R3 on the optical axis C1, the light emitting point R2 on the optical axis C2, and the light emitting point R1 on the optical C3 are made to emit light as shown by filled circles in FIG. 8, a virtual image S1 of the light emitting point R3 formed by the variable focal length lens L1, a virtual image S2 of the light emitting point R2 formed by the variable focal length lens L2, and a virtual image S3 of the light emitting point R1 formed by the variable focal length lens L3 are generated at the same location. At this moment, the equation (2) is satisfied with respect to the variable focal length lenses L1 and L2. With respect to the variable focal length lenses L1 and L3, give is following equation (6) obtained by multiplying both sides of the equation (2) by two.

$$2*d/b = 2*p/a \qquad (6)$$

The relationship of the equations (2) and (6) can be applied to any pixels in the vertical direction and the horizontal direction. That is, the three-dimensional display apparatus selects one light emitting point of the light emitting points 11 in five by five grid in each of twenty four pixels (5*5−1=24) of the pixels 12 surrounding one pixel of the pixels 12 as the center to allow the viewer to perceive virtual images of twenty five light emitting points of the light emitting points 11 as being overlapped.

When the viewer sees the light passing through the twenty five variable focal length lenses of the variable focal length lenses 21 of the three-dimensional display apparatus, the three-dimensional display apparatus so displays the virtual images of the light emitting points 11 that the viewer perceives the virtual images as being overlapped to perceive the light emitting points 11 as having an extension in depth.

A case is hereinafter described in which the three-dimensional display apparatus arranges the virtual images in a far distance.

In order to arrange the virtual images in a far distance so as to have the viewer perceive the virtual images in deep depth, the following equations (4) and (7) should be satisfied. The equation (7) is based on the equations (2) and (6). The equation (7) has a variable n which is an integer.

$$(2*n*d)/(n*b) = 2*p/a \qquad (7)$$

As is evident from the equation (4), where the virtual image distance b is n*b, the three-dimensional display apparatus displays the virtual image S1 of the light emitting point R3 and the virtual image S of another light emitting point R as being overlapped by causing the light emitting point R3 on the optical axis C1 and the light emitting point R to emit light. The light emitting point R is away from the center of the light emitting point R3 by the distance p in one pixel of the pixels 12 corresponding to an optical axis C of a variable focal length lens L away from the optical axis C1 by the distance n*d. As is evident from the equation (7), where the virtual image distance b is n*b, the three-dimensional display apparatus displays the virtual image S1 of the light emitting point R3 and the virtual image S of the another light emitting point R as being overlapped by causing the light emitting point R3 on the optical axis C1 and the light emitting point R to emit light. The light emitting point R is away from the center of the light emitting point R3 by the distance 2*p in the one pixel of the pixels 12 corresponding to the optical axis C of the variable focal length lens L away from the optical axis C1 by the distance 2*n*d.

The relationship of the equations (4) and (7) can also be applied to other pixels in the vertical direction and the horizontal direction. That is, the three-dimensional display apparatus selects one light emitting point of the light emitting points 11 in five by five grid in each of twenty four pixels of the pixels 12, around one pixel of the pixels 12 as the center, away from the light emitting point R3 of the one pixel of the pixels 12 as the center by the distance n*d and 2*n*d in the vertical direction and/or the horizontal direction. Thus, the three-dimensional display apparatus allows the viewer to perceive virtual images of twenty five of the light emitting points 11 as being overlapped at the virtual image distance of b multiplied by n.

As hereinabove described, the three-dimensional display apparatus having such optical system capable of overlapping the virtual images of a plurality of the light emitting points 11 enables the viewer to perceive the light emitting points 11 as having extension in depth, thus displaying three-dimensional images.

Further, the three-dimensional display apparatus as described above performs the operations as described in the first embodiment to display the number N of images each having a certain different depth on the two-dimensional display unit 10 by repeating displaying screens each having a prescribed depth on the two-dimensional display unit 10 in the sequence of the number N of screens in depth based on the switching signal provided by the screen switcher 41. Thus, the three-dimensional display apparatus has the viewer perceive the image data as three-dimensional images when the viewer views the light passing through the variable focal length lenses 21.

As hereinabove described, the three-dimensional display apparatus according to the second embodiment of this invention can increase the number of the variable focal length lenses 21 displaying one of the pixels 12, and is thus advantageous in capable of displaying the virtual images of the light emitting points 11 on the two-dimensional display unit 10 more stably in addition to the advantages of the three-dimensional display apparatus according to the first embodiment. The three-dimensional apparatus can express objects stereoscopically, namely, appearing to have extension in depth, through displaying the three-dimensional image as described above.

This invention is not limited to the embodiments as disclosed above. For example, although the light emitting points 11 forming one pixel of the pixels 12 are arranged in 5 by 5 grid in the second embodiment, more light emitting points can be arranged in the light emitting points 11 than in 5 by 5 grid. In such case, however, each of the virtual images may adversely shift when the light emitting points emitting light are chosen as described above, and thus the display data should be so generated that only a limited light emitting points emits light.

The eyes of the viewer are generally lined up in a substantially horizontal direction. Thus, it may be possible from a practical point of view to form a pixel having more light emitting points in the horizontal direction and to arrange in the horizontal direction more pixels of the two-dimensional display unit 10 so as to decrease the number of the light emitting points 11 and/or the number of the pixels in the vertical direction.

The three-dimensional display apparatus according to the present invention capable of being connected to personal computers, work stations, and the like is suitable as an information terminal apparatus. Furthermore, the three-dimensional display apparatus according to the present invention can display high definition information, and thus being very effective for the purpose of displaying designs made by CAD.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A three-dimensional display apparatus for displaying a three-dimensional image comprising:
   a display unit formed by arranging a plurality of pixels, each pixel having a plurality of light emitting points;
   a variable focal length lens panel including a plurality of variable focal length lenses arranged to correspond to each of said pixels forming said display unit;
   a display data generation unit for generating a plurality of display data arranged according to a plurality of depths in a three-dimensional space viewed by a viewer, said display data being based on data of a three-dimensional image to be displayed on said display unit;
   a lens driving unit for varying the focal length of each of said variable focal length lenses according to each depth of said display data; and
   a display driving unit for driving said light emitting points according to each depth of said display data,
   wherein at each depth of said generated display data, virtual images of plural ones of said light emitting points at plural ones of said pixels are formed by said plurality of variable focal length lenses such that the virtual images are perceived by the viewer as being overlapped,
   wherein said lens driving unit controls the focal length of said variable focal length lenses according to each depth of said display data in synchronization with displaying said display data on said display unit by display driving unit, and
   wherein said display data generation unit generates said display data to cause one of said light emitting points at a prescribed position to be driven in selected ones of the plural pixels in a surrounding area of any one of said plural pixels serving as a center so that the virtual images of said driven light emitting points are perceived as being overlapped.

2. The three-dimensional display apparatus according to claim 1, wherein each of said pixels forming the display unit has said light emitting points arranged in three by three grid.

3. The three-dimensional display apparatus according to claim 1, wherein each of said pixels forming the display unit has said light emitting points arranged in five by five grid.

4. The three-dimensional display apparatus according to claim 1, wherein said variable focal length lens panel has electrodes sandwiching liquid crystal, and wherein said liquid crystal acts as said variable focal length lenses whose focal length changes according to a driving voltage applied between said electrodes from said lens driving unit.

5. The three-dimensional display apparatus according to claim 4, wherein said lens driving unit applies said driving voltage to said liquid crystal so that said liquid crystal corresponding to a central portion of any one of said variable focal length lenses has larger refractive index than said liquid crystal corresponding to a peripheral portion of the one of said variable focal length lenses.

6. The three-dimensional display apparatus according to claim 5, wherein where a screen perceived as being deep should be displayed on said display unit, said lens driving unit renders the focal length of said variable focal length lenses shorter by applying a high voltage to said liquid crystal, and
   wherein where a screen perceived as shallow should be displayed on said display unit, said lens driving unit renders the focal length of said variable focal length lenses longer by applying a low voltage to said liquid crystal.

7. The three-dimensional display apparatus according to claim 1;
   wherein said variable focal length lens panel includes a first lens (L1); a second lens (L2) and a third lens (L3) serving as said plural variable focal length lenses;
   wherein said first lens has a first optical axis (C1);
   wherein said second lens has a second optical axis (C2);
   wherein said third lens has a third optical axis (C3);

wherein a distance (d+d) between said first optical axis and said third optical axis is arranged to be longer than a distance (d) between said first optical axis and said second optical axis;

wherein said first lens and said second lens are used to display an image of image data to be displayed as being shallow by emitting light from a first light emitting point arranged on said first optical axis with separation from said first lens towards said virtual image direction (distance a) and emitting light from a second light emitting point arranged in a position shifted from said second optical axis towards said first optical axis direction (distance p) with separation from said second lens towards said virtual image direction (distance a), said second lens having a focal length defined as a first focal length; and wherein said first lens of said first optical axis and said third lens of said third optical axis, located farther than said second optical axis with respect to said first optical axis, are used to display an image of image data to be displayed as being deep by emitting light from said first light emitting point arranged on said first optical axis with separation from said first lens towards said virtual image direction (distance a) and by emitting light from a third light emitting point arranged in a position shifted from said third optical axis towards said first optical axis direction (distance p) with separation from said first lens towards said virtual image direction (distance a), said third lens having a focal length defined as a second focal length being shorter than said first focal length.

8. The three-dimensional display apparatus according to claim 7, wherein said first focal length or said second focal length (f) is longer than a distance (a) from said focal variable lens to said light emitting point.

9. The three-dimensional display apparatus according to claim 8, wherein said second light emitting point is arranged in a position shifted from said second optical axis to said first optical axis direction by a prescribed distance (p).

10. The three-dimensional display apparatus according to claim 9, wherein said third light emitting point is arranged in a position shifted from said third optical axis to said first optical axis direction by the prescribed distance (p).

11. The three-dimensional display apparatus according to claim 10, wherein the distance (d+d) between said first optical axis and said third optical axis is double relative to the distance (d) between said first optical axis and said second optical axis.

12. The three-dimensional display apparatus according to claim 11, wherein said second optical axis is arranged between said first optical axis and said third optical axis.

13. The three-dimensional display apparatus according to claim 12, wherein said first light emitting point is located away from said first lens toward said virtual image direction by a distance a, said second light emitting point is located away from said second lens toward the virtual image direction by the distance a, and said third light emitting point is located away from said third lens towards the virtual image direction by the distance a.

* * * * *